United States Patent [19]

Kurata

[11] Patent Number: 4,488,184
[45] Date of Patent: Dec. 11, 1984

[54] VIDEODISC PLAYBACK SYSTEM
[75] Inventor: Hirotaka Kurata, Tokyo, Japan
[73] Assignee: Trio Kabushiki Kasha, Japan
[21] Appl. No.: 326,004
[22] Filed: Nov. 30, 1981
[30] Foreign Application Priority Data Dec. 19, 1980 [JP] Japan .............................. 55-180037

[51] Int. Cl.³ .............................................. H04N 0/00
[52] U.S. Cl. .................................... 358/342; 358/907
[58] Field of Search ............... 358/342, 327, 312, 907; 360/10.1, 10.2; 369/43, 47, 48, 50, 44

[56] References Cited
U.S. PATENT DOCUMENTS

| 3,973,080 | 8/1976 | Dickopp et al. ................. 358/907 X |
| 4,308,557 | 12/1981 | Dieterich .......................... 369/47 X |
| 4,321,635 | 3/1982 | Tsuyuguchi .......................... 369/32 |
| 4,361,849 | 11/1982 | Bolger ................................. 358/312 |
| 4,363,117 | 12/1982 | Wine ..................................... 369/43 |
| 4,375,094 | 2/1983 | Kelleher et al. .................... 369/43 |

Primary Examiner—Donald E. McElheny, Jr.
Attorney, Agent, or Firm—Gerald J. Ferguson, Jr.; Joseph J. Baker

[57] ABSTRACT

A videodisc playback system is equipped with a reading device that sequentially reads the key code signals recorded on a videodisc in order to discriminate field, frame, or track. A mistracking pulse generator temporarily stores two key code signals that were consecutively read from the reading device, compares the two stored key code signals and detects the occurrence of mistracking from the two key code signals, and at the same time, generates mistracking pulses in an expanded blanking time, in a number that corresponds to the number of tracks travelled in the opposite direction to the playback shifting direction when the mistracking was detected. A forced driving device forcibly shifts the playback tracks one track at a time in the playback shifting direction with every mistracking pulse impressed from the mistracking pulse generator.

4 Claims, 24 Drawing Figures

FIG. 1
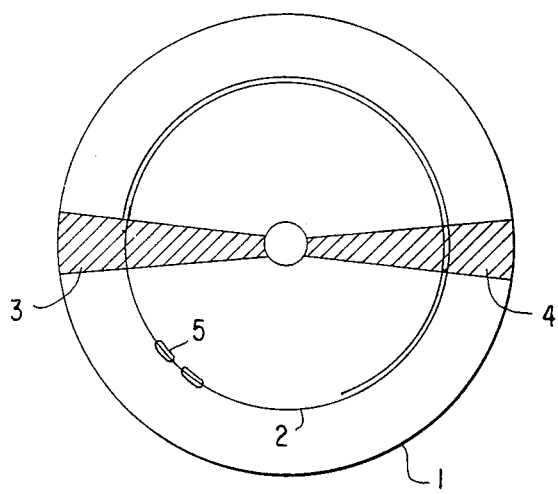
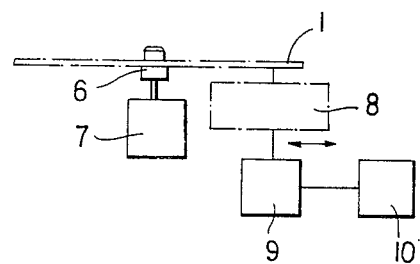
FIG. 2

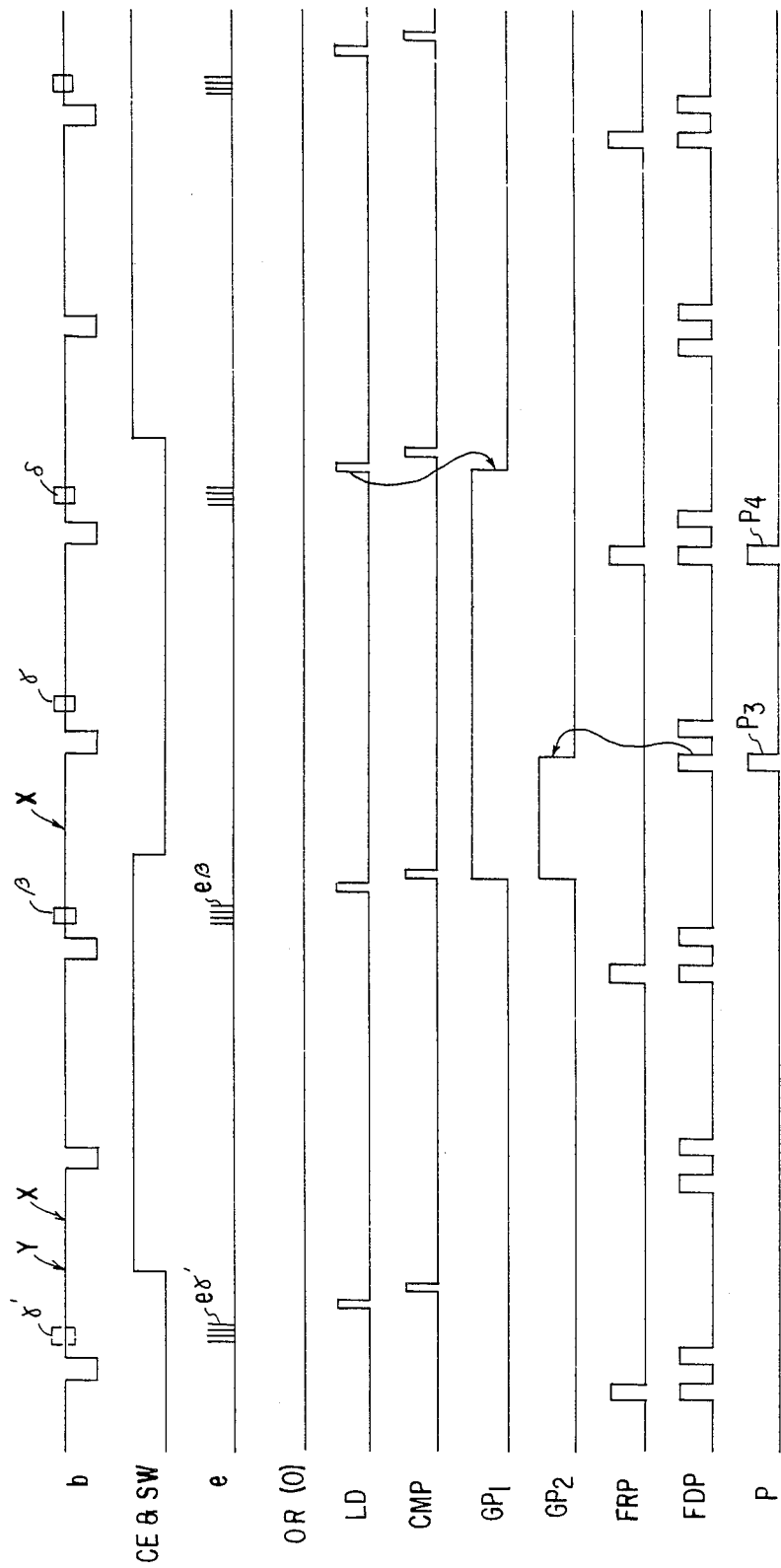

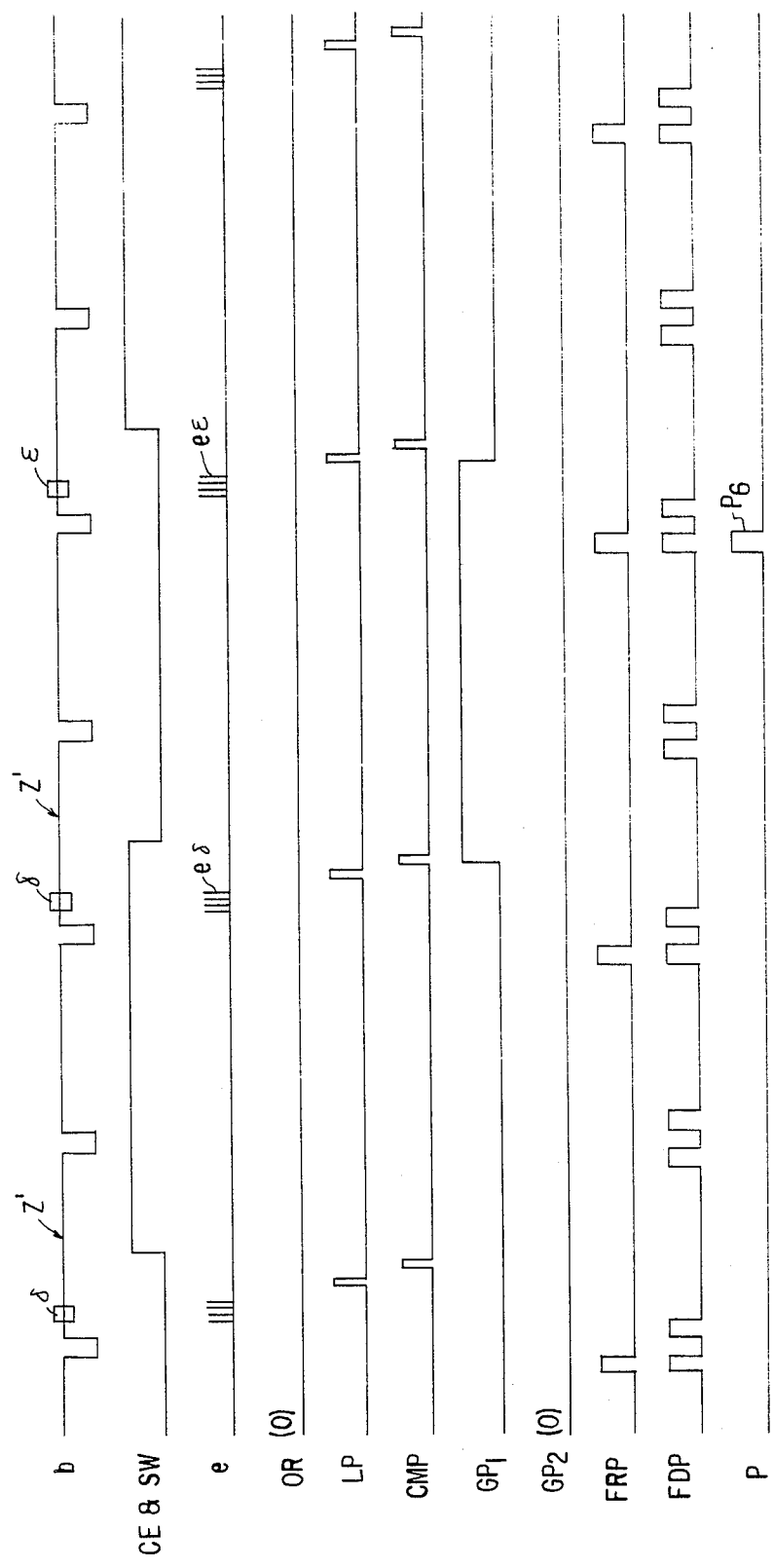

VIDEODISC PLAYBACK SYSTEM

BACKGROUND OF THE INVENTION

This invention relates to a videodisc playback system that reproduces information signals such as video and audio signals from a videodisc. The purpose of this invention is to produce a videodisc playback system designed such that even if there are omissions in parts of the signals recorded on the videodisc, they do not stop the progression of the reproduced images during playback time, and a still image does not occur.

A videodisc playback system is generally equipped with a signal reader having a means to mount and rotate a videodisc where information signals are recorded as a form of longitudinally positioned indentations forming spiral tracks; a converting device for detecting and reproducing information signals, etc.; a shifting device that shifts the scanning position of the said converting device in a direction that intersects the above-mentioned tracks almost at right angles, that is, in the radial direction of the videodisc; and a control device that controls the above-mentioned shifting device so that the above-mentioned scanning position is on the track.

Videodisc playback systems are available as optical, capacitance, or mechanical playback systems. Using an optical videodisc playback system as an example, the outline of its signal reader unit is briefly explained regarding the part related to this invention.

A videodisc with recorded signals to be reproduced by an optical videodisc playback system is structured as shown in FIG. 1. On the videodisc (simply noted as disc hereafter) 1, FM-modulated signals that are multiplexed with a video signal and an audio signal are recorded as longitudinally positioned indentations forming spiral tracks as shown by track 2. The above-mentioned indented area is called a pit and is shown as 5 in FIG. 1. For example, when the disc 1 is rotated at a uniform angular velocity, the video signals are recorded so that ½ revolution of the disc 1 comprises one field, and one revolution makes one frame. The vertical blanking time in the composite video signal, that is, the vertical retrace time is positioned at areas 3 and 4 in FIG. 1. Usually, key code signals to discriminate the field, frame, or track are recorded in the vertical retrace time. As for the recording of information on the disc 1, the track pitch is 1.5–2 micrometers, and the pit length, which varies from the outer circumference side to the inner circumference side of the disc 1, ranges from 0.5–2 micrometers resulting in the very high density recording of signals.

As shown in FIG. 2, the videodisc playback system is equipped with a motor for rotating the removable disc 1, which is affixed on a turntable 6, at a constant angular velocity and a control circuit 7 to control the revolutions of the said motor. The videodisc playback is equipped with an optical system 8 for reading the signals from the recorded information surface of the disc 1 rotated by the motor. As shown in FIG. 3, the optical system 8 is equipped with a laser 11 that emits a linearly polarized light flux; a raster grating 12 for obtaining three light beams from the laser 11; a spot lens 13; a beam-splitting polarizing prism 14 for reflecting the light flux passed through the spot lens 13; a ¼ wavelength plate 15 that converts the light reflected by the prism 14 to circular polarized light flux; a reflecting mirror (noted as tangential mirror) 16 for total reflection of the circular polarized light flux from the ¼ wave length plate 15 and deflection in a direction tangential to the track; a reflecting mirror (noted as tracking mirror) 17 that deflects the light from the tangential mirror 16 in the radial direction of the disc 1; and an objective lens 18 which focuses the beam from the laser 11 onto the recorded signal surface of the disc 1. This beam is modulated at pits 5, returns in a path reverse to that taken above, converted to a linear polarized wave with the ¼ wavelength plate 15, passed through the beam-splitting polarizing prism 14 and a cylindrical lens 19, and the reflected beam from the disc 1 is projected onto a photoelectric conversion system 20 and is read as an electrical signal.

The optical system 8 is shifted in the radial direction of the disc 1 by a shifting device 9 that is driven by a shifting motor 10. In order to read the signals correctly from the disc 1, it is necessary to rotate the disc 1 at a constant angular velocity, and the motor that rotates the disc 1 is controlled by a servo system. In addition, related also to optical system 8, it is necessary to focus the beam on the recorded signal surface on the disc 1 as mentioned before. Consequently, focus controlling is done from the surface of the disc 1 to control the position of the objective lens 18. Tangential control is also done by controlling the angle of the tangential mirror 16 and driving the light spot on the disc 1 in a direction tangential to the tracks 2 to suppress time-base fluctuation. Furthermore, tracking control is done in which the angle of the tracking mirror 17 is controlled so that the light spot scans over the center of the width of the tracks 2, and shifting of the optical system 8 is controlled. Of these control systems, the control of revolutions, focus control, and tangential control are not directly related to this invention, and are not discussed any further.

Tracking control is used, as shown in FIG. 4(a), to generate tracking light beams 22 and 23 with the signal-reading light beam 21 (called playback light beam hereafter) in between. The tracking light beams 22 and 23 scan over the disc 1 in synchronism with the playback light beam 21 to detect whether or not the playback light beam 21 is correctly scanning over the tracks. The method shown here is called a triple beam system, and the tracking light beams 22 and 23 are formed by the raster grating 12. There is another method called a single beam method. In this case, the diffracted light, which is generated when the light beam strikes the pits, is used to detect tracking.

The playback light beam 21 and the tracking light beams 22 and 23 are in a prescribed relationship of trigonometric positions: when the playback light beam 21 is in the normal position, the tracking light beams 22 and 23 are not centrally positioned in the track width, but they are set, as shown in FIG. 4(a), such that the tracking light beam 22 that precedes the playback light beam 21 is positioned off to the lower side of pits 5 in FIG. 4(a), the tracking light beam 23 that follows is positioned off to the upper side of pits 5 in FIG. 4(a), and the areas on pits 5 affected by tracking light beams 22 and 23 are equivalent. Consequently, when the playback light beam 21 is positioned off the tracks 2, the areas on pits 5 affected by tracking light beams 22 and 23 will be different. In order to have the playback light beam 21 scan the center of the tracks 2 by applying the above fact, the reflected beams of tracking light beams 22 and 23 are detected by photoelectric converter elements 25 and 26 respectively as shown in FIG. 4(b), and the outputs of the photoelectric converter elements 25 and 26 are inputted into a differential amplifier 27 and their difference is detected and amplified to determine whether or not the playback light beam 21 is correctly positioned over the track 2. The reflected beam of the playback light beam 21 is received by the photoelectric converter element 24, converted into electrical signals, and derived as a playback RF output. The output of the differential amplifier 27 is a tracking error signal. The output signal of the differential amplifier 27, that is the tracking error signal, drives the tracking mirror 17 through the driver amplifier 28 and concurrently drives the shifting motor 10 through the driver amplifier 29 so that the tracking error signal is controlled to zero.

There are cases when pits 5 on disc 1 are missed due to scratches or dust adhesion on the disc 1 during the manufacturing process or in storage after they were manufactured. When pits 5 are missed, a change in tracking error voltage cannot be obtained, and in spite of the fact that tracks to be played back are being shifted in the radial direction of disc 1 by the rotation of disc 1, the playback light beam and tracking light beam maintain the position just before the missing pit for a short time. Consequently, the tracking light beam will have shifted to the side of the neighboring track during the missing pit period. The signal recorded on this track to which shifting occurred, is a signal which had already been read, and this phenomenon is repeated every time the missing pit is encountered. Thus, the playback images stop progressing, the playback shifting is interrupted, and a still image results.

The above explanation was made regarding the case of optical videodisc playback system. However, the same phenomenon is induced in the case of a capacitance or mechanical videodisc playback system where the principle is the same as with the above-mentioned system.

SUMMARY OF THE INVENTION

As stated before, the purpose of this invention is to produce a videodisc playback system designed such that even if there are missing pits on the disc, the progression of the playback images does not stop during signal playback.

This objective is achieved according to this invention by detecting the mistracking by using a key code signal recorded to discriminate the field, frame, or track; and when mistracking is detected, by generating a number of mistracking pulses that correspond to the number of tracks shifted in the opposite direction of the playback direction; then, by forcibly driving the playback track one track at a time in the playback direction for every mistracking pulse.

BRIEF DESCRIPTION OF THE DRAWINGS

FIG. 1 is a schematic plan of a videodisc.

FIG. 2 is a schematic block diagram showing the configuration of the information reading device in a videodisc playback system.

FIG. 7 is a circuit diagram showing one example of a control circuit and a forced driving pulse generator in FIG. 5.

FIGS. 8, 9, 10(a), 10(b), 11(a), 11(b), 12(a), 12(b), 13(a), 13(b), 14(a), 14(b), 15(a), 15(b), 16(a) and 16(b) are timing diagrams supplied for the explanation of the actions of the preferred embodiment of this invention illustrated in FIG. 5.

DESCRIPTION OF THE PREFERRED EMBODIMENT

Figure 3:
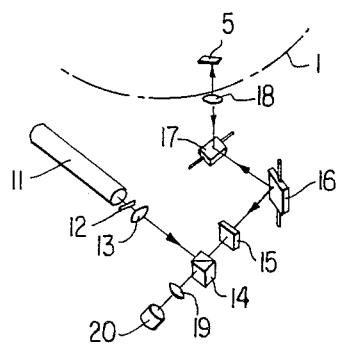
FIG. 3 is an explanatory diagram for the optical system of the videodisc playback system.
Figure 4A:
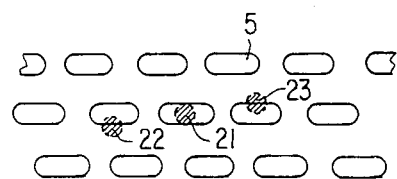
FIGS. 4(a) and (b) are diagrams illustrating the explanation of the tracking control.
Figure 4B:
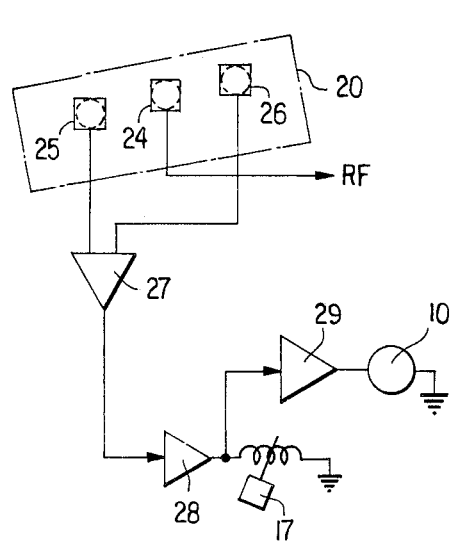
Figure 5:
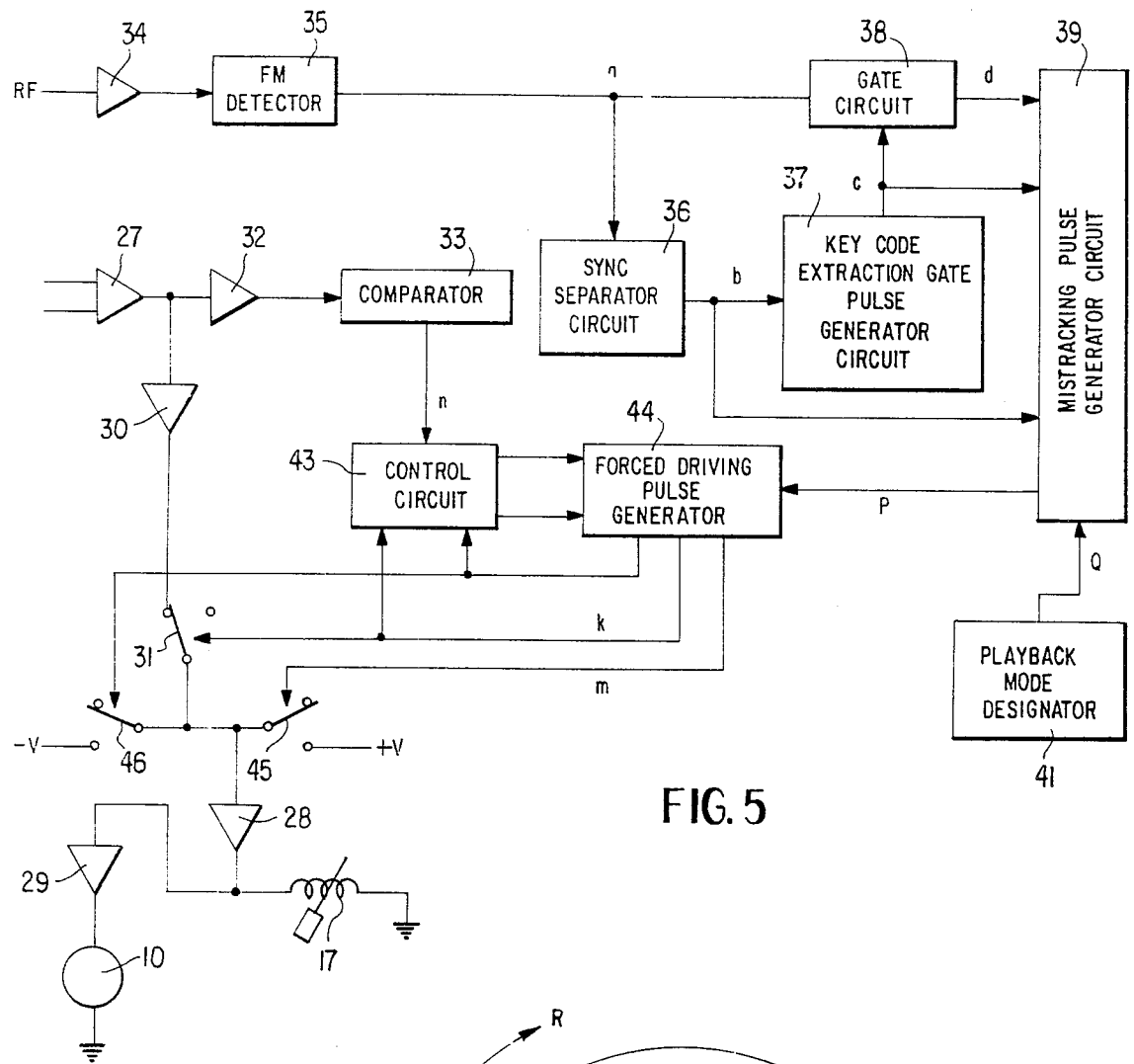
FIG. 5 is a block diagram of the preferred embodiment of this invention.
Figure 5:
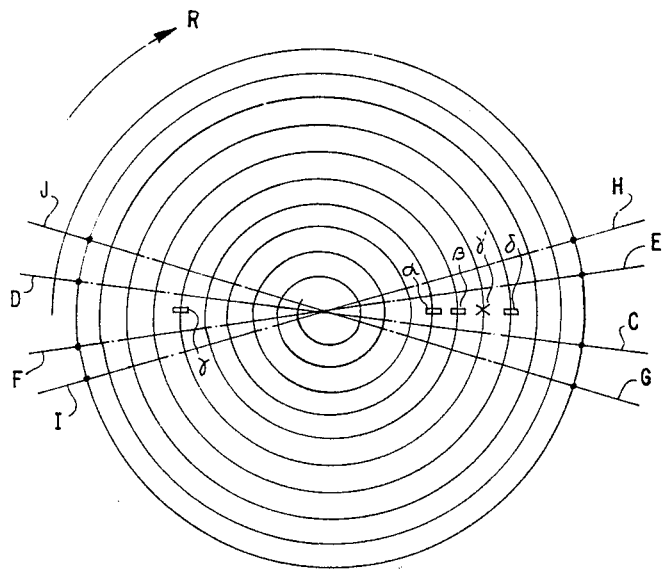

FIG. 5 is a block diagram of the preferred embodiment of this invention. The output signal of the differential amplifier 27 is inputted to an amplifier 30 to be amplified, and a loop switch 31 is installed between the amplifier 30 and the driver amplifier 28 to configure the tracking control loop to be switchable with an external signal. The output signal of the differential amplifier 27 is impressed on the comparator 33 through the amplifier 32. The standard voltage of comparator 33 is set at zero volts. In the following explanation, the driver amplifiers 28 and 29, shifting motor 10, and the tracking mirror 17 are called the target tracking unit as a whole.

The output signal RF of the photoelectric converter element 24 obtained by converting the reflected beam of the playback light beam 21 to an electrical signal is amplified by the amplifier 34 and impressed on the FM detector 35. A sync separator circuit 36 extracts only the synchronizing signals from the output signals a of the FM detector 35. A key code extraction gate pulse generator circuit 37 generates a gate pulse c for extracting key code signals recorded superimposed on the prescribed horizontal synchronizing signal during the vertical retrace time based on the synchronizing signal b extracted from the sync separator circuit 36. A gate circuit 38 is turned on and off by the gate pulse c, being in the on-state during the time when the key code signal is superimposed and in the off-state during other times, and extracts key code signal times from the output signal a of the FM Detector 35. A mistracking pulse generator circuit 39 temporarily stores the key code signal of each continuous two frames sequentially detected from the output signal d of the gate circuit 38, or temporarily stores one key code signal sequentially detected and another key code signal synthesized based on the said key code signal, and generates a prescribed number of mistracking pulses P at mistracking times by comparing the two stored key code signals and determining whether mistracking has occurred or not.

A playback mode designator 41 of the videodisc playback system inputs signal Q to the mistracking pulse generator 39 only during the normal playback mode designation of the playback mode designator 41. The mistracking pulse generator 39 is equipped with a gate circuit that outputs a mistracking pulse P only during the normal playback mode designation.

A forced driving pulse generator control circuit 43 (simply called control circuit hereafter) controls the forced driving pulse generator 44. The inputs to the control circuit 43 are the output signal n of the comparator 33, the loop switch control signal k from the forced driving pulse generator 44 that controls the switching of the loop switch 31, and the second change-over switch control signal j that controls the switching of the second change-over switch 46. The forced driving pulse generator 44 uses the signal from the control circuit 43 and the mistracking signal P from the mistracking pulse generator circuit 39 as inputs and provides as outputs the loop switch control signal to the loop switch 31, the first change-over switch control signal m that controls the switching of the first change-over switch 45, and the second change-over switch control signal j to the second change-over switch 46.

The first change-over switch 45 is switched from the contact point shown in FIG. 5 by the impression of the first change-over switch control signal m, and it impresses voltage +V on the target tracking unit during the switched duration. The target tracking unit is driven in the reverse direction by the impression of voltage +V. The second change-over switch 46 is switched from the contact position shown in FIG. 5 by the impression of the second change-over switch control signal j, and it impresses voltage −V on the target tracking unit during the switched duration. The target tracking unit is driven in the forward direction by the impression of voltage −V. The reverse direction is defined as the direction of tracks which have already been reproduced, and the forward direction is defined as the normal shifting direction for playback. The target tracking unit is also driven in the reverse direction to suppress the excess motion of the target tracking unit during shifting in the forward direction due to inertia of the target tracking unit and to prevent overrun.

Figure 6:
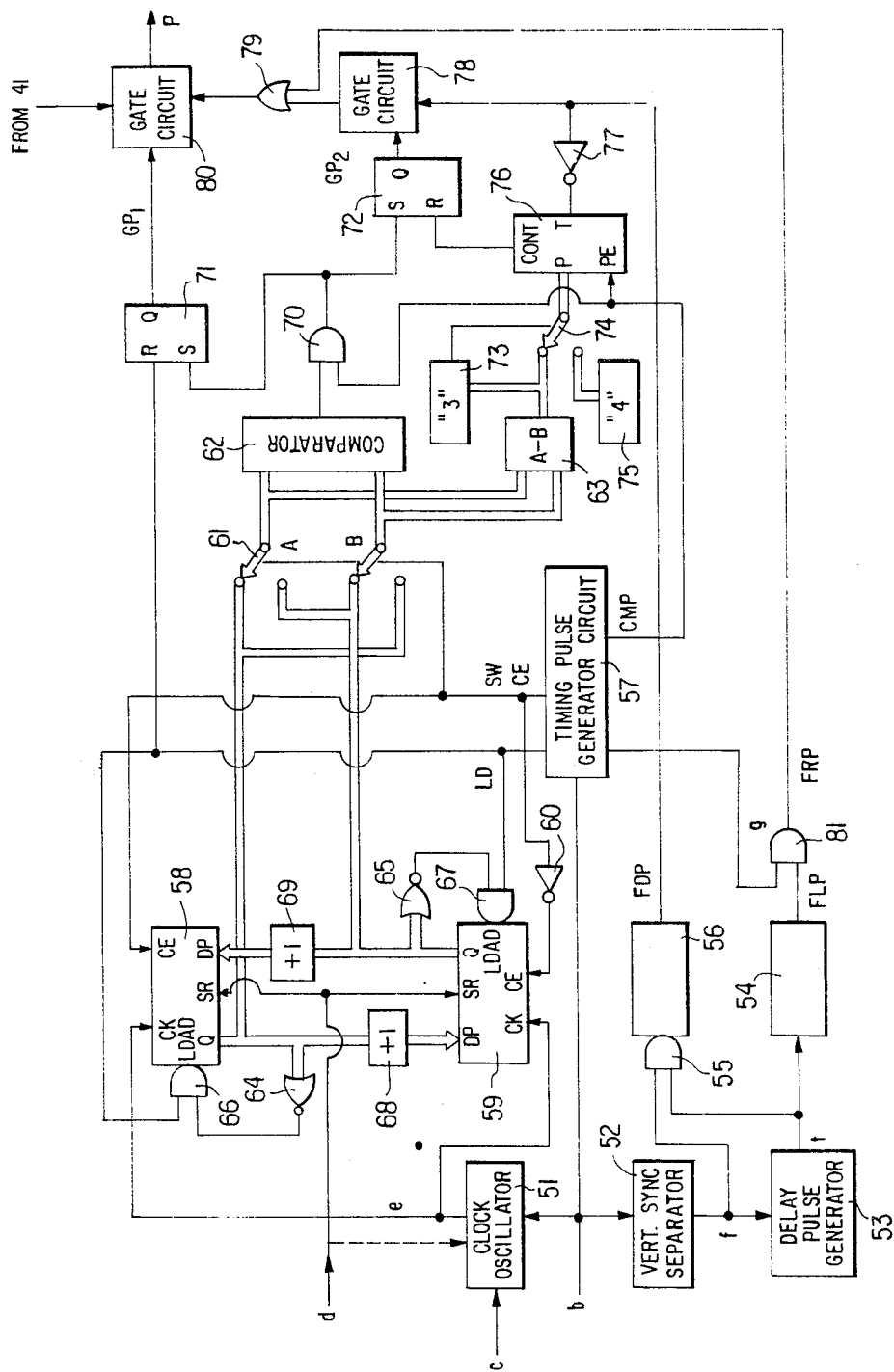
FIG. 6 is a block diagram showing one example of a mistracking pulse generator circuit in FIG. 5.

Next, an explanation is made regarding the configuration of the mistracking pulse generator circuit 39, control circuit 43, and the forced driving pulse genrator 44. FIG. 6 is a block diagram of the mistracking pulse generator circuit 39. A clock oscillator 51 generates the clock pulse e to read the key code signal, "1" or "0", serially into the memories 58 or 59 based on the synchronizing signal b extracted by the sync separator circuit 36 and the output signal d of the gate circuit 38. Since key code signals are generally biphase codes, etc. modulated by the words comprised of a set of "1's" and "0's" as elements, it is necessary to extract the modulated words by decoding the modulated carrier wave in order to compare the key code signals, and the key code signals are decoded by this clock pulse. A vertical sync separator circuit 52 extracts the vertical synchronizing signal f from the synchronizing signal b extracted by the sync separator circuit 36. A delay pulse generator circuit 53 generates pulses after a fixed time has passed in reference to the vertical synchronizing signal extracted by the vertical sync separator circuit 52. The delay time of the delay circuit 53 is set such that the delay pulse t from the delay circuit 53 does not overlap the vertical synchronizing signal f, but is positioned in the vertical retrace time of the next field. A monostable multivibrator 54 is triggered by the delay pulse t. An AND gate 55 inputs the vertical synchronizing signal f and the delay pulse t. A monostable multivibrator 56 is triggered by the output of the AND gate 55. A timing pulse generator circuit 57 outputs a memory enabling signal CE that inverts every two frames based on the synchronizing signal b and switching signal SW, and at the same time, it also outputs frame signal g that inverts with every frame, load signal LD, and comparison control signal CMP. Memories 58 and 59 are comprised of serial-in, parallel-out shift registers, and use as their inputs the output signal d of the gate circuit 38 and the clock pulse e. The memories 58 and 59 are enabled by the memory enabling signal CE, and they temporarily store the key code signal from the output signal d of the gate circuit 38. The outputs of memories 58 and 59 are inputted respectively to the NOR gates 64 and 65, and the outputs of the NOR gates 64 and 65 are inputted respectively to AND gates 66 and 67 which use the load signal LD as one of their input signals. The outputs of the AND gates 66 and 67 are inputted respectively to the memories 58 and 59. The output of the memory 59 is incremented by +1 at the increment circuit 69 by the output signal of the AND gate 66 and is read into memory 58, and the output of the memory 58 is incremented by +1 at the increment circuit 68 by the output signal of the AND gate 67 and is read into memory 59. A switch 61 switches the outputs of memories 58 and 59 and guides them to the comparator 62 and the subtracter 63, and it is switched by the switching signal SW of the timing pulse generator circuit 57. In the normal state of switch 61, the memory output appearing at the output terminal B of the switch 61 is compared in comparator 62 with that of terminal A to determine if it is greater than the memory output appearing at the output terminal A. The subtracter 63 computes the difference in the memory output appearing at the output terminal B of the switch 61 from the memory output appearing at the output terminal A of switch 61 and outputs the value of A−B>0.

An AND gate 70 sets the flip-flops 71 and 72 with its output signals using the comparison control signal CMP of the timing pulse generator circuit 57 as one input and the output of the comparator 62 at the time of A≧B as the other input. The flip-flop 71 is reset by the load pulse LD of the timing pulse generator circuit 57. A register 73 has a numerical value "3" set into it. When the output (A−B≧0) of the subtracter 63 is less than "3", the switch 74 leads the output of the subtracter 63 to the preset terminal of the counter 76, and when the output (A−B≧0) of the subtracter 63 is 3 or more, the switch 74 is switched and the set value of the register 75 is preset to the counter 76. A numerical value "4" is set into the register 75. The counter 76 counts the number of output pulses of the monostable multivibrator 56 which have been inverted by the inverter 77, and the output value of the switch 74 is preset by the comparison control signal CMP of the timing pulse generator 57. The output of the counter 76 resets the flip-flop 72. A gate circuit 78 is controlled by the Q output GP$_2$ of the flip-flop 72. The gate circuit 78 impresses the output pulse of the monostable multivibrator 56 as one input on the OR gate 79, which has the FRP output of the AND gate 81 as the other input. A gate circuit 80 is controlled by the normal mode designator signal Q from the playback mode designator 41 and the output of flip-flop 71, and uses as its input the output of the OR gate 79 and outputs the mistracking pulse P.

Figures 7, 9:
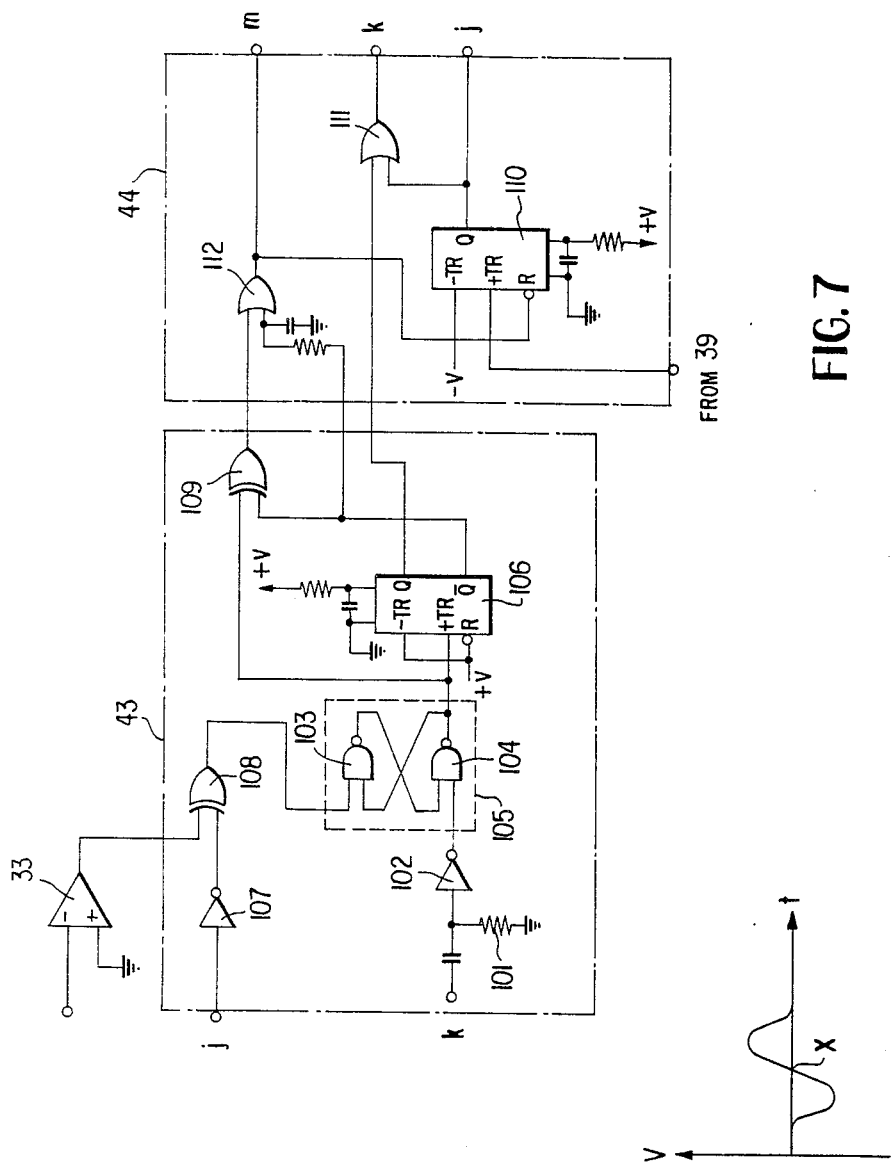

As shown in FIG. 7, the control circuit 43 is comprised of a differentiating circuit 101 that differentiates the loop switch control signal k. A flip-flop 105 is comprised of an inverter 102 that inverts the output of the differentiating circuit 101 and NAND gates 103 and 104 and is set by the output of the inverter 102. A monostable multivibrator 106 is triggered by the Q output of the flip-flop 105. An inverter 107 inverts the second change-over switch control signal j. An exclusive OR circuit 108 is fed by the outputs of the inverter 107 and the comparator 33, and an exclusive OR circuit 109 is fed by the $\overline{Q}$ output of the monostable multivibrator 106. The flip-flop 105 is reset by the output of the exclusive OR circuit 108.

The forced driving pulse generator 44 is comprised of a monostable multivibrator 110 that is triggered by the mistracking signal P from the mistracking pulse generator circuit 39. An OR gate 111 is fed by the Q output of the monostable multivibrator 109 and the Q output of the monostable multivibrator 106. An OR gate 112 is fed by the output of the exclusive OR circuit 109 and the $\overline{Q}$ output of the monostable multivibrator 106. The monostable multivibrator 110 is reset by the output of the OR gate 112. The output of the OR gate 111 serves as the loop switch control signal k, the output of the OR gate 112 serves as the first change-over switch control signal m, and the Q output of the monostable multivibrator 110 serves as the second change-over switch control signal j.

Figure 8:
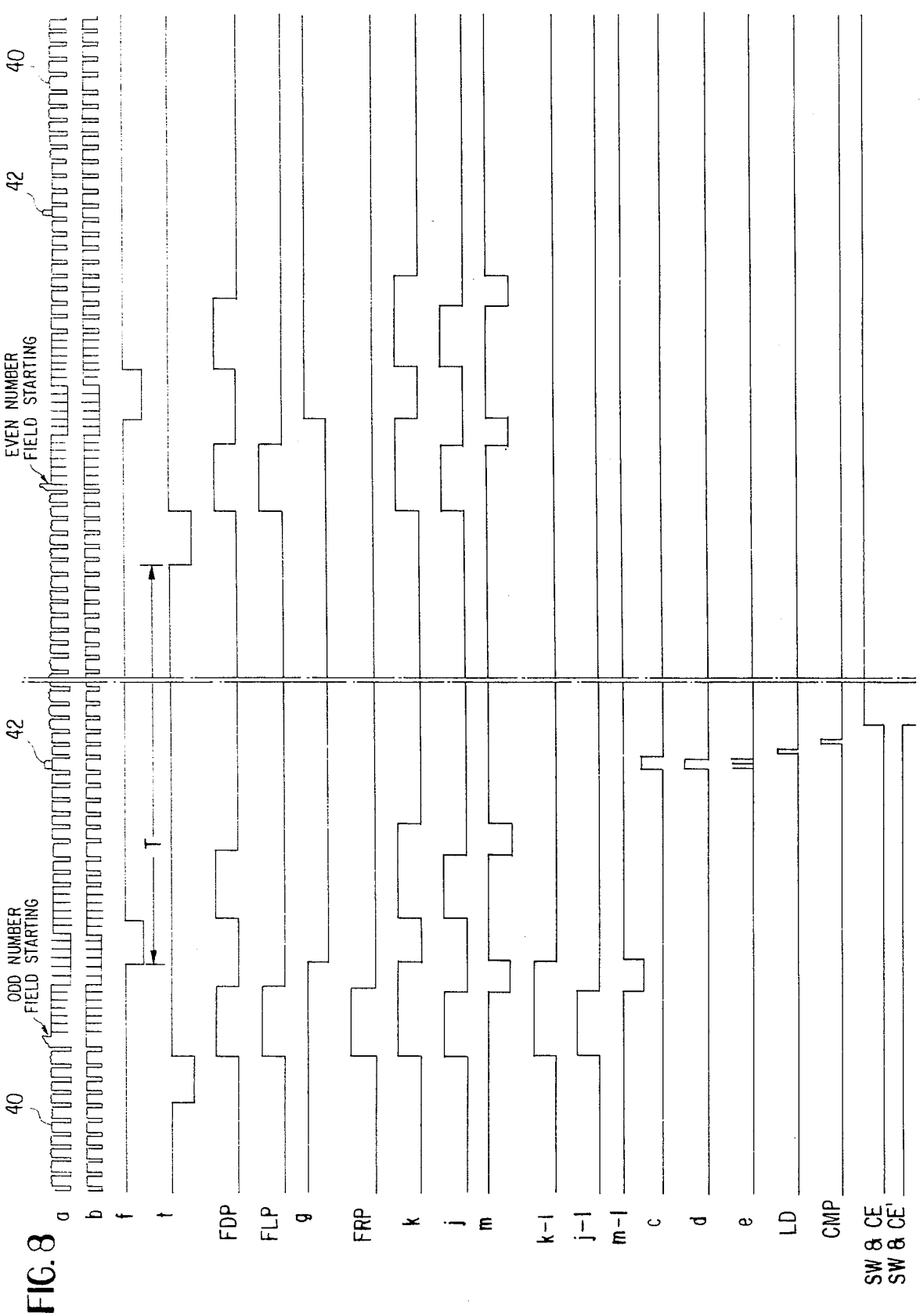

The operation of this practical example configured as above is explained using FIG. 8 and subsequent diagrams. The RF signal from the photoelectric converter element 24 is an FM wave, and this RF signal is amplified by the amplifier 34. This amplified FM wave is FM-detected by the FM Detector 35, and the composite video signal a is outputted from the FM detector 35. The output signal a of FM detector 35 is as shown by waveform a in FIG. 8; 40 shows a video signal, and 42 shows a key code signal. At the output signal a from the FM detector circuit 35, the synchronizing signal b is extracted by the sync separator circuit 36. The synchronizing signal b is as shown by waveform b in FIG. 8. The key code extraction gate pulse generator circuit 37 generates the key code signal extraction gate pulse c shown by waveform c in FIG. 8 based on the synchronizing signal b of waveform b in FIG. 8 from the sync separator circuit 36. The gate circuit 38 clamps the synchronizing signals within the composite video signal a shown by waveform a in FIG. 8, extracts only the video signal 40 and key code signal 42, gates these signals with the output signal c from the key code extraction gate pulse generator circuit 37 and extracts only signal d shown by waveform d in FIG. 8.

The clock pulse oscillator 51 generates a clock pulse shown at e in FIG. 8 based on the synchronizing signal b or signal d extracted by the gate circuit 38; and the key code signal from signal d extracted by gate circuit 38 is stored in memory 58 or 59 by the memory enabling signal CE of the timing pulse generator circuit 57. The vertical sync separator circuit 52 extracts the vertical synchronizing signal f from the synchronizing signal b. The vertical synchronizing signal f is shown as waveform f in FIG. 8. The delay pulse generator circuit 53 outputs delay pulse output t delayed by time T in reference to vertical synchronizing signal f. This delay pulse output t is shown as waveform t in FIG. 8.

Consequently, the monostable multivibrator 54 is triggered by the rise of the delay pulse output t and generates the output pulse shown by waveform FLP in FIG. 8; and the monostable multivibrator 56 is triggered by the rise of the AND output of the vertical synchronizing signal f and delay pulse output t and generates a pulse shown by waveform FDP in FIG. 8.

The memory enabling signal CE, switching signal SW, load signal LD, frame signal g, and comparison control signal CMP outputted by the timing pulse generator circuit 57 are generated with the timing shown by waveforms SW&CE, SW&CE', LD, g, and CMP in FIG. 8 respectively. And, waveform SW&CE' shows a continuation of the memory enabling signal CE and the switching signal SW shown by waveform SW&CE. Thus, the output pulse FRP of the AND gate 81 is obtained as a logical product of the output pulse FLP of the monostable multivibrator and the frame signal g, thus resulting in the waveform FRP shown in FIG. 8.

Next, the forced driving of the target tracking unit is first explained prior to a detailed explanation of the operation of the mistracking pulse genrator circuit 39. When the playback mode designator 41 is indicating a normal playback mode, and the flip-flop 71 is generating a Q output, the gate circuit 80 has its gate open; and if the gate circuit 78 has its gate closed, the output pulse FRP of the AND gate 81 is outputted directly for the mistracking pulse P. Or, when the gate circuit 80 opens its gate, and the gate circuit 78 also has its gate open, the output signal FDP of the monostable multivibrator 56 is outputted directly for the mistracking pulse P. This is due to the fact that a part of the output signal FDP is overlapping the output signal FRP.

When the mistracking signal P is inputted to the forced driving pulse generator 44, the monostable multivibrator 110 is triggered by its rise, the Q output of the monostable multivibrator 110 goes to a high level, and the Q output of the monostable multivibrator 110 is impressed on the loop switch 31 as the loop switch control signal k through the OR gate 111, and the OR gate 111 maintains the loop switch 31 at the off-state during its high level duration. On the other hand, the Q output of the monostable multivibrator 110 is impressed directly on the second change-over switch 46 as the second change-over switch control signal j, which maintains the second change-over switch 46 in the on-state during the high level of the Q output of the monostable multivibrator 110. As a result of the second change-over switch 46 becoming on-state, voltage $-V$ is impressed on the target tracking unit, and the target tracking unit is driven in the forward direction. As a result of the Q output of the monostable multivibrator 110 becoming high level, the Q output signal that passed the OR gate 111, i.e., the loop switch control signal k, is impressed on the differentiating circuit 101 and is differentiated. This differentiated output is inverted by the inverter 102 and sets the flip-flop 105 with the rise of the loop-switch control signal k. The monostable multivibrator 106 is triggered by the flip-flop being set, and the Q output of the monostable multivibrator 106 is outputted as the loop switch control signal k through the OR gate 111. At this time, the loop switch control signal k is already being outputted, but even if the monostable multivibrator 110 is reset, the loop switch control signal is maintained by the Q output of the monostable multivibrator 106. Meanwhile, the tracking error signal changes to a negative polarity as shown in FIG. 9 due to the target tracking unit being driven in the forward direction as a result of the Q output of the monostable multivibrator 110, namely the second change-over switch control signal j changing to a high level. Consequently, the output of the comparator 33 is at a high level. Since the second change-over switch control signal j is inverted by the inverter 107 and impressed on the exclusive OR circuit 108, the output of the exclusive OR circuit is at a high level. Since the output from the flip-flop 105 to the exclusive OR circuit 109 is at a high level, and the $\overline{Q}$ output of the monostable multivibrator 106 is at a low level, the output of the exclusive OR circuit 109 is at a high level and the OR gate 112 is generating a high level output. However, the first change-over switch 45 is a change-over switch that is switched to an on-state by a negative pulse, and the first change-over switch is not switched. When the playback light beam 21 has reached exactly the middle position between the adjacent track in the forward direction due to forward driving of the target tracking unit, the tracking error signal generates an output of the point X in FIG. 9, and at the instant when this output at point X changes to a positive polarity, the comparator 33 is switched to a low-level output. Consequently, the output of the exclusive OR circuit 108 becomes a low-level output, and the flip-flop 105 is reset. Thus, the input of the exclusive OR circuit 109 from the flip-flop 105 becomes a low level, and the output of the exclusive OR circuit 109 becomes a low level. Consequently, the output of the OR gate 112 is at a low level, that is, the first change-over switch control signal m is outputted. The monostrable multivibrator 110 is reset by the first change-over switch control signal m, the second change-over switch control signal j becomes a low level, and the second change-over switch 46 becomes off-state. Concurrently, the first change-over switch 45 is switched to the on-state as a result of the first change-over switch control signal m becoming a low level. Voltage +V is impressed on the target tracking unit, and the target tracking unit is driven in the reverse direction. At this time, the loop switch control signal k is maintained unchanged at the high level state by the Q output of the monostable multivibrator 106, and the loop switch 31 is in the off-state.

Due to the above-mentioned reverse driving of the target tracking unit, forward shifting of the target tracking unit due to inertia is suppressed, and the target tracking unit shifts in the forward direction while the forward shifting speed of the target tracking unit is being reduced. When the set time of the monostable multivibrator has reached, the Q output of the monostable multivibrator 106 becomes a low level, the loop switch 31 returns to the on-state, the tracking servo loop is closed, and the target tracking unit is controlled by the output of the differential amplifier 27. At the same time, as a result of the $\overline{Q}$ output of the monostable multivibrator 106 going to a high level, the output of the exclsuive OR circuit 109 becomes a high level and is passed through the OR gate 112 causing the second changeover switch control signal m to become a high level and the second change-over switch 45 to return to an off-state.

With every mistracking pulse P impressed on the forced driving circuit 44 by the action as explained above, the tracks will be shifted forcibly in the forward direction. Consequently, when the output pulse of the waveform FDP shown in FIG. 8 is outputted as a mistracking pulse P, the loop switch control signal k, the first change-over switch control signal m, and the second change-over switch control signal j are outputted as shown by waveforms k, m, and j in FIG. 8, and the target tracking unit is forcibly shifted two tracks in an expanded blanking time interposed by the starting point of the first field, and two tracks in the expanded blanking time interposed by the starting point of the second field, thus effecting the forced shifting of four tracks in one frame. When the output pulse of waveform FRP shown in FIG. 8 is outputted as a mistracking pulse P, the loop switch control signal k, the first change-over switch control signal m, and the second change-over switch control signal j are outputted as shown by waveforms k-1, m-1, and j-1 in FIG. 8; and the target tracking unit is forcibly shifted one track in the expanded blanking time interposed by the starting point of the first field, thus effecting forced shifting of one track in one frame.

It was explained above that the tracks are shifted in the expanded blanking time. However, when the delay time T is set such that the delay pulse of the delay pulse generator circuit 53 is generated in the blanking time on the synchronizing signal, the tracks will be shifted in the blanking time on the synchronizing signal. Here, the expanded blanking time means the actual blanking time when no display appears on the receiver screen. For this reason, image jitter does not appear on the screen.

Figure 10B:
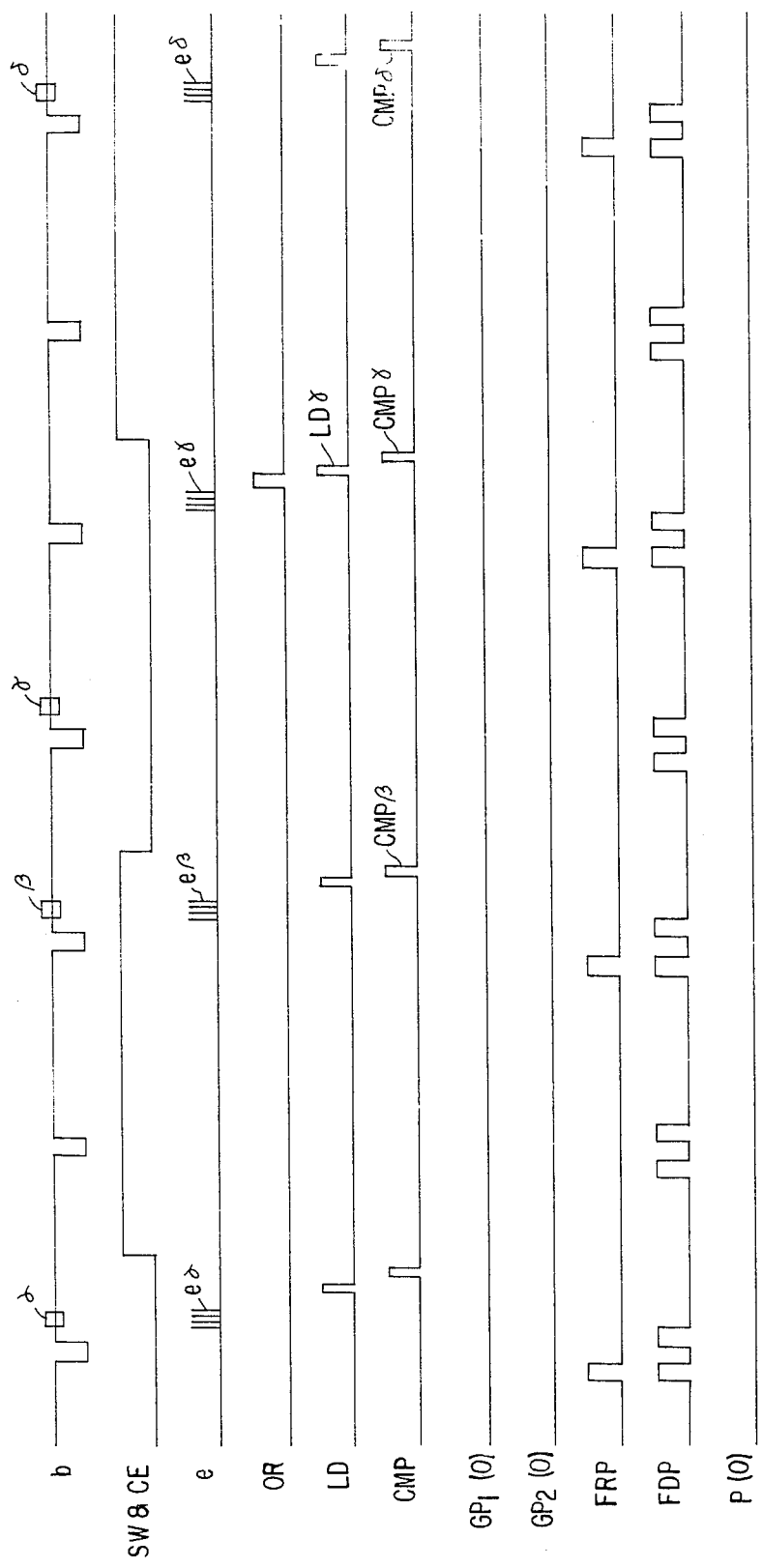

Next, the mistracking pulse generator circuit 39 is explained including its operation. First, an explanation is made regarding a case in which there is no omission of pits on any of the tracks of the videodisc. FIG. 10(a) shows a track on a videodisc. C is the starting line of the odd-number field. D is the starting line of the even number field. Arrow R is the rotational direction of the videodisc. The area between lines C and E and the area between lines D and F are the blanking zone on the synchronizing signal, and the area between lines G and H and the area between lines I and J are the substantial blanking zone. $\alpha$, $\beta$, $\gamma$, and $\delta$ are key code signals 42 that show respective frames, and they are assumed to have been set in binary codes such that their value is increased by "+1" with forward shifting. The above-mentioned facts are the same in FIGS. 11(a) through 16(a) below. The memory enabling signal of the timing pulse generator circuit 57 is as shown by waveform SW&CE in FIG. 10(b). First, the key code signal $\alpha$ is read according to $e_\alpha$ of the clock pulse e into the memory 58 and stored temporarily. In the next field, the memory 59 is enabled by the memory enabling signal CE of the timing pulse generator circuit 57, and the key code signal $\beta$ is read according to $e_\beta$ of the clock pulse e into the memory 59 and stored temporarily. At the same time, the switch 61 is switched to the position shown in FIG. 6 by the switching signal SW, and the key code signal $\beta$ stored in the memory 59 and the key code signal $\alpha$ stored in the memory 58 are compared at the comparator 62. A relationship of $\alpha+1=\beta$ exits between the key code signals $\alpha$ and $\beta$, and since $A=\alpha<\beta=B$, no output is generated from the comparator 62 to the AND gate 70. Consequently, even when the gate of the AND gate 70 is opened by the comparison control signal CMP$\beta$ shown in FIG. 10(b), the flip-flops 71 and 72 are not set, the gate circuits 78 and 80 do not generate an output, and normal playback is performed without forced shifting of the tracks. In the next field of playback, key code signal $\gamma$ is recorded. However, since the key code extraction gate pulse generator circuit 37 is not generating the key code extraction gate pulse C at the key code signal $\gamma$ position, the key code signal $\gamma$ is not read into the mistracking pulse generator circuit 39. Meanwhile, the key code extraction gate pulse C is generated at the track position (shown by $\gamma'$ in FIG. 10(a)) between key code signals $\beta$ and $\delta$, a key code signal is extracted, and memory 58 is enabled. However, since no key code signal is recorded at the $\gamma'$ position, "0" is stored in the memory 58. When the memory 58 stores "0", the NOR gate 64 generates a high potential output as shown by OR in FIG. 10(b), the stored content (key code $\beta$) of the memory 59 is incremented by "+1" by the increment circuit 69 and loaded into memory 58 synchronously with the load signal LD$\gamma$ of the timing pulse generator circuit 57, and key code ($\beta+1$) is stored in the memory 58. Needless to say, the key code ($\gamma+1$) is equivalent to key code $\gamma$. The switch 61 is switched by the switching signal SW from the timing pulse generator circuit 37, the terminal A of the switch 61 is connected to memory 59 and the terminal B of the switch 61, to the memory 58 respectively, and the stored contents of the memories 58 and 59 are compared at the comparator 62. In this case, $(\beta+1=B)>(\beta=A)$ results, and no output is generated from the comparator 62 to the AND gate 70. Consequently, even when the gate of the AND gate 70 is opened by the timing of the comparator signal CMP$\gamma$ in FIG. 10(b), the flip-flops 71 and 72 are not set, the gate circuits 78 and 80 do not generate an output, and normal playback is performed without forced shifting of tracks. Then, the playback of the next frame proceeds, the memory 59 is enabled, and the key code signal $\delta$ is read into the memory 59 according to the timing pulse $e_{67}$ and temporarily stored. In this case, the key code $(\beta+1)=\gamma$ is stored in the memory 58 as stated above. The switch 61 is switched to the position shown in FIG. 6 by the switching signal SW from the timing pulse generator circuit 57, and the stored contents of the memories 58 and 59 are compared at the comparator 62. In this case, $(\delta=B)>(\beta+1=A)$ results, and no output is generated from the comparator 62 to the AND gate 70. Consequently, even when the gate of the AND gate 70 is opened by the timing of the comparator signal CMP$\delta$ shown in FIG. 10(b), the flip-flops 71 and 72 are not set, the gate circuits 78 and 80 do not generate an output, and normal playback is carried out without forced shifting of the tracks. Playback is performed in the same manner hereafter, and normal playback will proceed. In the above explanation, the subtracter 63 is performing (A-B) subtraction, but no output is generated because (A-B)<0, and the counter 76 has no presetting value, and the subtracter 63 and the counter 76 do not influence the mistracking pulse P. The actions of the subtracter 63 and the counter 76 will become clear subsequently.

Figure 11A:
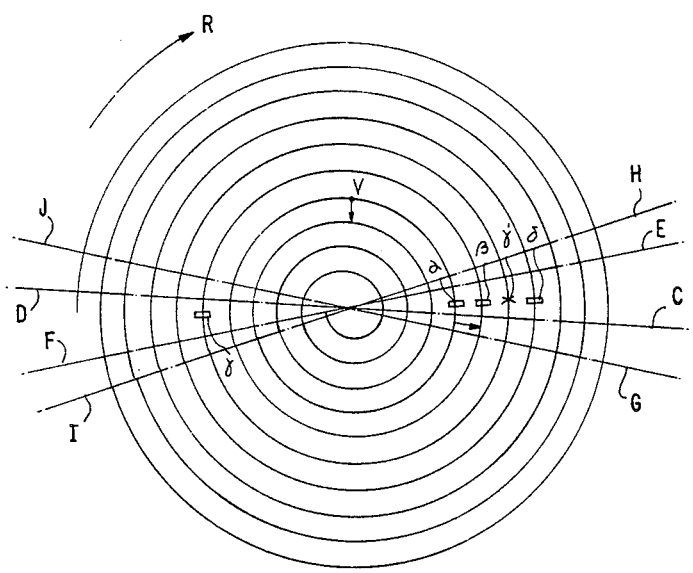
Figure 11B:
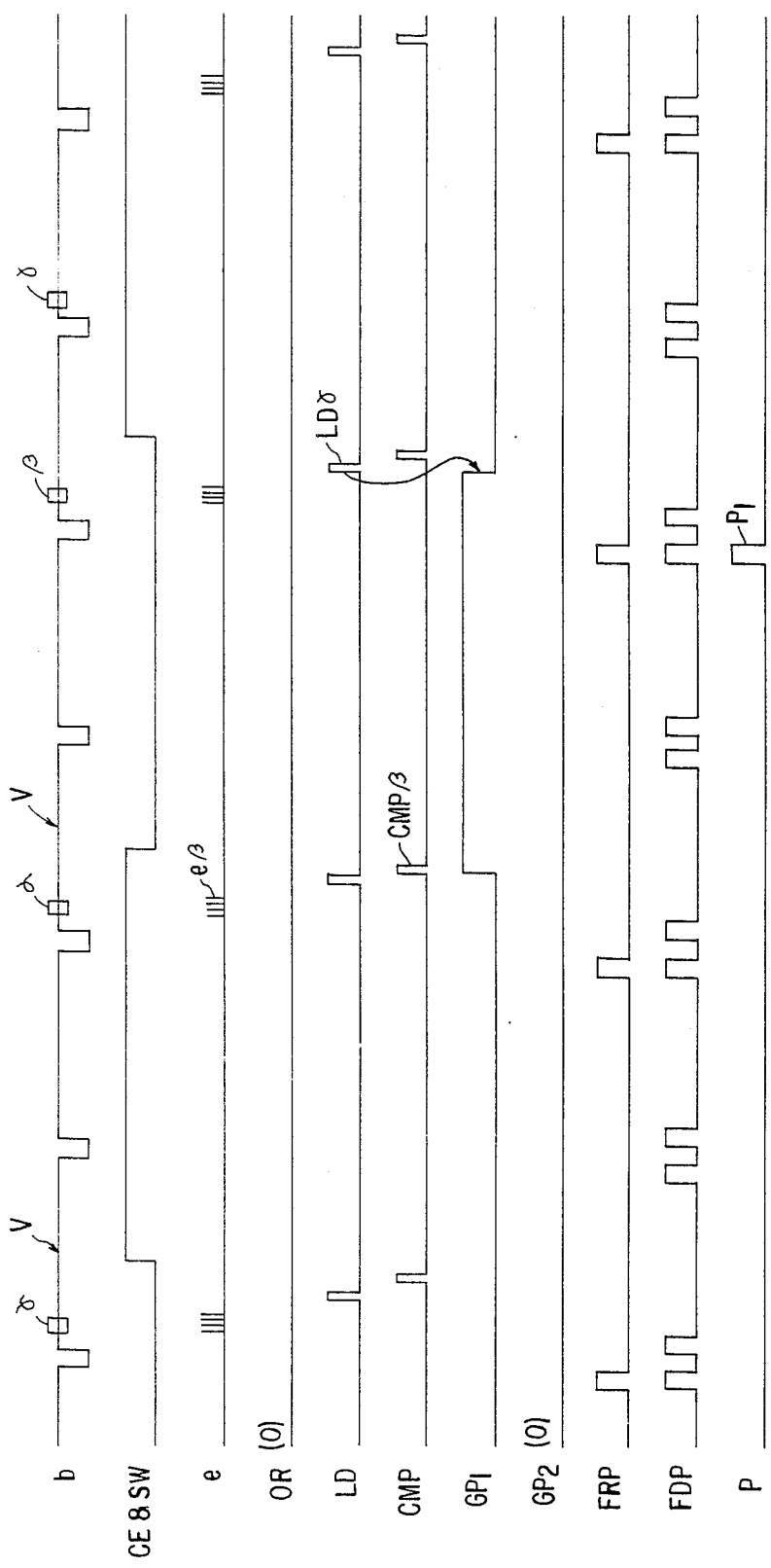

Next, an explanation is made regarding the case in which there is a pit omission in one field from the key code signal $\alpha$ as shown in FIG. 11(a). The site of the omission is shown by V. As in the case of FIG. 10(a), a key code signal $\alpha$ is stored in the memory 58 during playback. During the reproduction of the next field, the playback shifts over to the track one frame in reverse at the pit omission point V, and the key code signal $\alpha$ is again read into the memory 59 and stored when the next clock pulse $e_{62}$ is generated. Consequently, key code signal $\alpha$ is stored at both memories 58 and 59, the switch 61 is switched to the contact position shown in FIG. 6, the comparator 62 generates an output because $(\alpha=A)=(\alpha=B)$, the AND gate 70 generates a pulse caused by the comparison control signal CMP$\beta$, and the flip-flop 71 is set. As a result of the flip-flop 71 being set, the gate circuit 80 opens. At the same time, the operation $(\alpha=A)-(\alpha=B)$ is performed by the subtracter 63, but the result of the operation is zero, and the counter 76 has no preset value because A-B=0<"3" (set value of the register 73). The flip-flop 72 is set by the output from the comparator 62, but it is immediately reset by the output pulse from the counter 76. Consequently, the Q output of the flip-flop 72 is at a low level, the gate circuit 78 has its gate closed, and the output pulse of the monostable multivibrator 56 is not outputted to the OR gate 79. The flip-flop 71 is reset by the load signal LD, shown by LD$\gamma$ in FIG. 11(b), from the timing pulse generator circuit 57, and the gate circuit 80 closes its gate. Thus, the Q outputs of the flip-flops 71 and 72 result as shown by waveforms GP$_1$ and GP$_2$ of FIG. 11(b), the mistracking pulse P is generated in the substantial blanking time of the second field after the key code signal $\alpha$ shown by waveform P$_1$ in FIG. 11(b) is read in twice, and the target tracking unit is forcibly shifted one track in the forward direction. Consequently, the key code signal $\beta$ is stored temporarily at the memory 58. In this state, the switch 61 has been switched from the position shown in FIG. 6, and key code signals $\alpha$ and $\beta$ are compared at the comparator 62. At this time, the comparator 62 generates no output since $(A=\alpha)<(B=\beta)$, and subsequently no forced shifting of tracks occurs, but normal playback as explained by FIGS. 10(a) and (b) is executed. Consequently, in the case of one missing pit, the playback image does not result in a still image, but merely the key code signal $\alpha$ frame is played back twice, then shifting to normal playback.

Figure 12A:
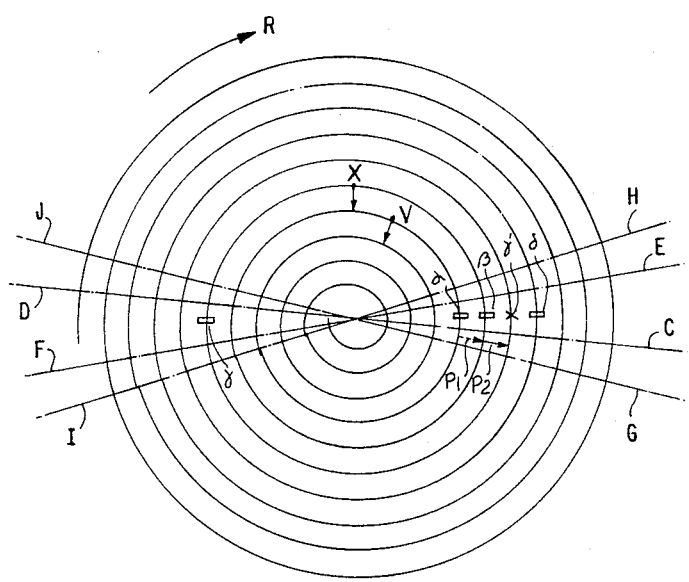
Figure 12B:
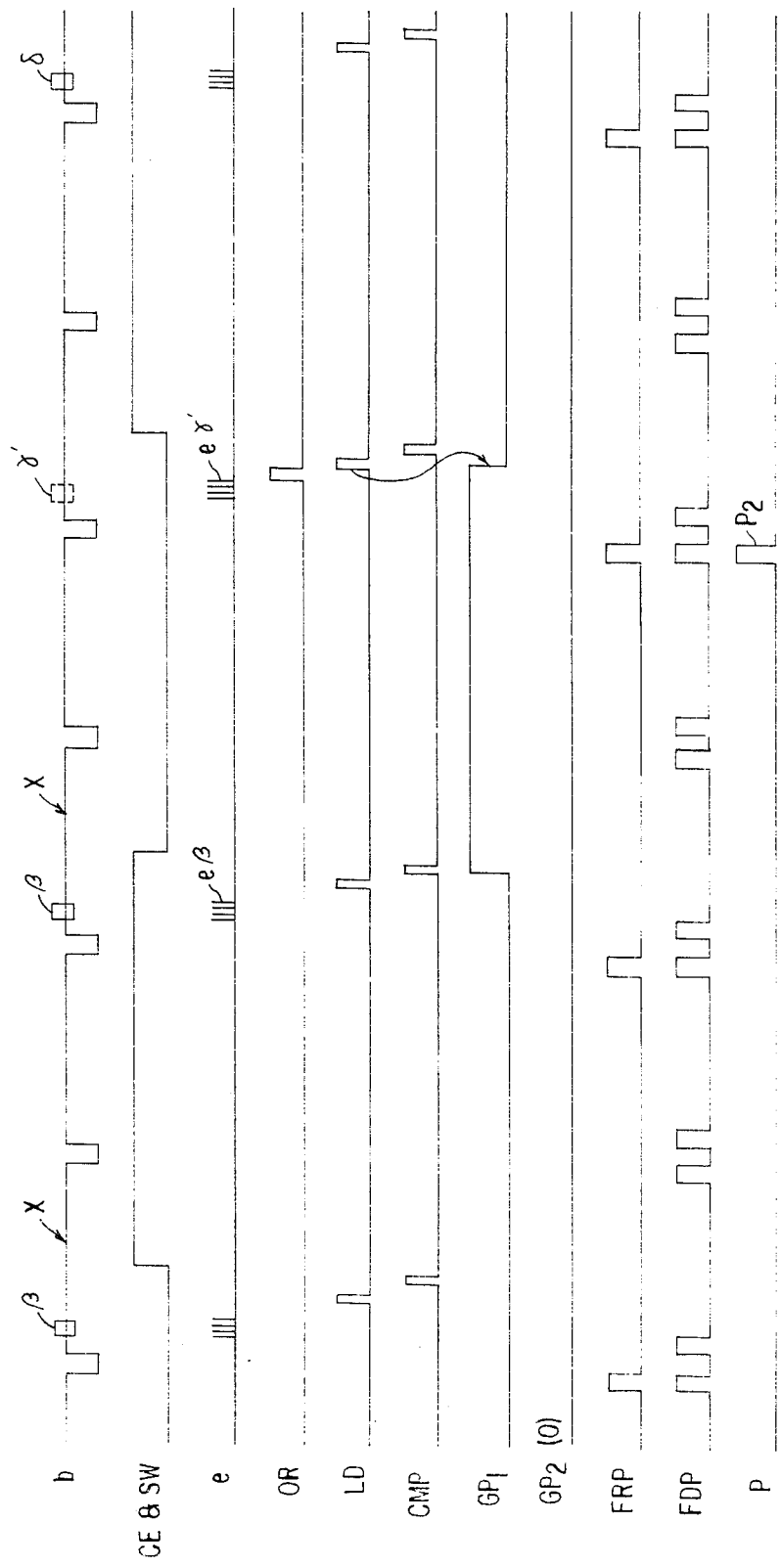

Next, an explanation is made regarding a case in which there is a further pit omission site X in one field from the key code signal $\beta$ shown in FIG. 12(a), and pit omission sites of point V and point X occur. Regarding the pit omission site, point V, playback proceeds up to the field containing the key code signal $\beta$ by the same action explained above using FIGS. 11(a) and (b). Waveforms subsequent to the reading of the key code signal $\beta$ are shown in FIG. 12(b).

After the key code signal $\beta$ is read, playback proceeds, and at point X, the playback track will be shifted one track in the reverse direction, the frame containing the key code signal $\alpha$ will be played back and the key code signal $\beta$ is again read by the clock pulse $e_{62}$. In this case, the memory 59 has already been enabled by the memory enabling signal CE, and the key code signal $\beta$ that had been read for the second time is stored in memory 59. Switch 61 has been switched to the position shown in FIG. 6 by the switching signal SW, and the contents of the memories 58 and 59 are compared by comparator 62. In this case, $(B=\beta)=(A=\beta)$, and the comparator 62 generates an output. This is the same as the above-mentioned case explained by FIGS. 11(a) and (b). The flip-flop 71 is set, the key code signal $\beta$ is read for the second time, and after one track is again shifted in the reverse direction at point X omission site, a mistracking pulse P$_2$ is generated just before the next even field playback is completed, and the playback track is forcibly shifted one track in the forward direction. After the playback track shifting caused by this mistracking pulse P$_2$, a clock pulse e$\gamma'$ is generated, and the key code signal is read in. However, as shown in FIG. 12(a), no key code signal exists at the $\gamma'$ position. Thus, zero is stored in the memory 58, the NOR gate 64 and increment circuit 69 operate the same as in the previous case, and the stored contents of memory 59, $\beta$ incremented by "+1", $(\beta+1)$, is stored in the memory 58. The switch 61 has been switched from the position shown in FIG. 6 by the switching signal SW, $(B=\beta+1)$ and $(A=\beta)$ are compared by the comparator 62. The comparator 62 generates no output since $(B=\beta+1)>(A=\beta)$, and subsequently no forced shifting of tracks occurs, but normal playback will be continued.

Figure 13A:
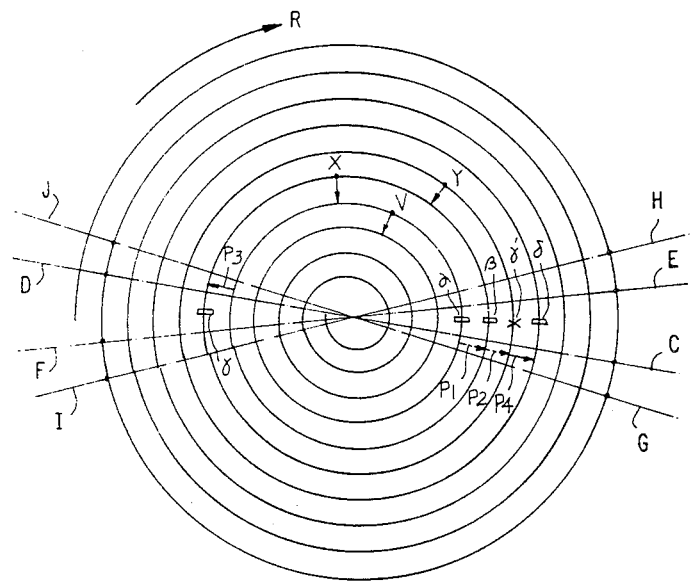

Next, an explanation is made regarding the case in which there is a further pit omission site Y at a track which is one track forward from the pit omission site, point X, as shown in FIG. 13(a), thus the omission sites are points V, X, and Y in all. Regarding the pit omission sites, points V and X, the same actions as in the above-mentioned explanation using FIGS. 12(a) and (b) take place, and playback proceeds to point $\gamma'$ of FIG. 13(a). The waveforms subsequent to point $\gamma'$ are shown in FIG. 13(b).

As explained with FIGS. 12(a) and (b), ($\beta+1$) is stored in memory 58 at point $\gamma'$. Playback proceeds and the playback track is shifted one track in the reverse direction at point Y, and further shifted one track in the reverse direction at point X. Consequently, with the next generation of clock pulse $e_\beta$, the key code signal $\beta$ is read into the memory 59 and stored. At this time, the switch 61 has been switched to the position shown in FIG. 6 by the switching signal SW. Therefore, $B=\beta$ and $A=\beta+1$ are compared by the comparator 62, and since $(A=\beta+1)>(B=\beta)$, the comparator 62 generates an output, and the flip-flops 71 and 72 are set. On the other hand, the subtracter 63 is performing the operation of $(A=\beta+1)-(B=\beta)$ where the result is "1". Since this is less than the set value "3" of the register 73, the switch 74 remains at the position shown in FIG. 6, and the counter 76 is preset to "1". Consequently, the counter 76 will generate a count-out output by counting only one pulse of the output pulses, i.e., signal FDP from the monostable multivibrator 56. The flip-flop 72 is reset by this count-out output. Consequently, during this time, the flip-flop 72 becomes a high-level output as shown by waveform $GP_2$ in FIG. 13(b), the gate circuit 78 is open during this time, and lets only one pulse of signal FDP to pass. This one pulse passes through the gate circuit 80 and is outputted as the mistracking pulse $P_3$. And, during the time when the gate circuit 80 is open, one pulse of the output pulse ERP is impressed through the OR gate 79. Thus, this output pulse ERP is outputted as the mistracking pulse $P_4$. The mistracking pulse $P_3$ is generated immediately after even-number field playback begins after passing point X for the second time as shown in FIG. 13(b), and the mistracking pulse $P_4$ is generated just before the above-mentioned even-number field playback is completed. As shown in FIG. 13(a), as a result of shifting the playback tracks by a total of two tracks in the forward direction caused by mistracking pulses $P_3$ and $P_4$, the key code signal $\delta$ will be read after shifting caused by mistracking pulse $P_4$. Therefore, the key code signal $\delta$ is read into the memory 58 and compared by the comparator 62 as $B=\delta$ and $A=\beta$. However, since $(B=\delta)>(A=\beta)$, the comparator 62 does not generate an output, and no forced shifting of the playback tracks occurs subsequently, but normal playback proceeds.

Figure 14A:
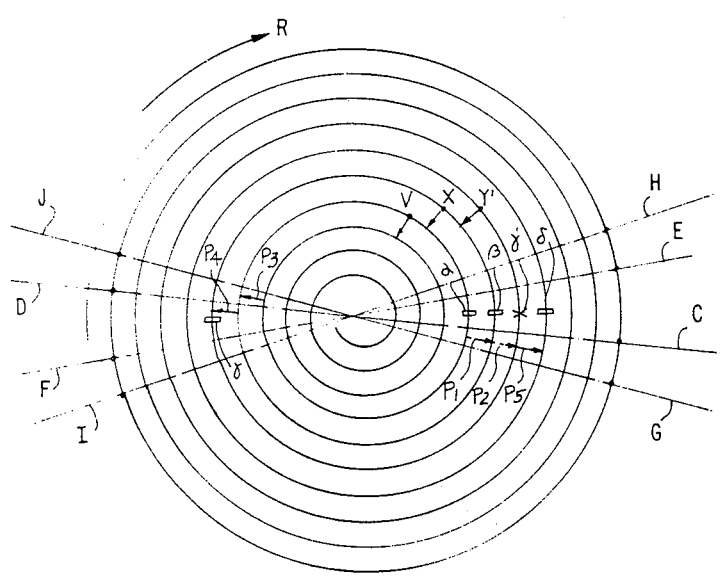
Figure 14B:
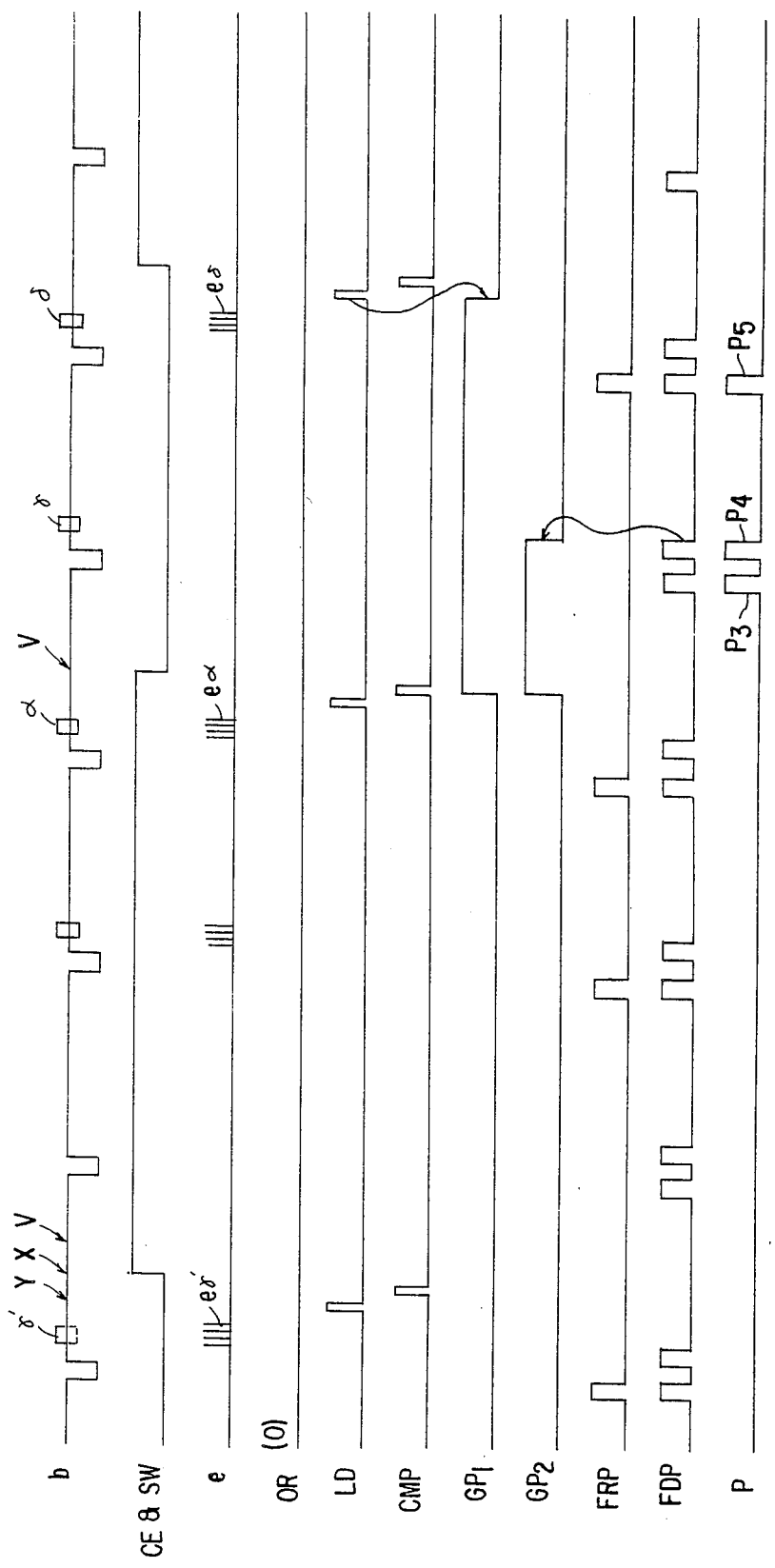

Next, an explanation is made regarding a case in which there are three pit omission sites as shown in FIG. 14(a), but the pit omission site, point Y in the case of FIG. 13(a) is at point Y'. For the pit omission sites, points V and X, the same actions as explained above with FIGS. 12(a) and (b) take place, and playback proceeds up to point $\gamma'$ in FIG. 14(a). FIG. 14(b) shows the waveforms subsequent to this point $\gamma'$. In FIGS. 12(a) and (b), a forced shifting of the tracks occurs in the forward direction caused by the generation of mistracking pulse $P_2$, playback continues passing points $\gamma'$, Y', X, and V, and because of the presence of omission sites, playback proceeds by shifting three tracks in the reverse direction, returning to the track where key code signal $\alpha$ is recorded. Then, the key code signal $\alpha$ is read into enabled memory 59 by the clock pulse $e_{60}$ shown in FIG. 14(b) and stored. ($\beta+1$) is being stored as explained with FIGS. 12(a) and (b). The switch 61 has been switched to the position shown in FIG. 6 by the switching signal SW, $A=\beta+1$ and $B=\alpha$ are compared at comparator 62, comparator 62 generates an output because $(A=\beta+1)>(B=\alpha)$, and the flip-flops 71 and 72 are set. Consequently, gate circuits 78 and 80 open their gates. Meanwhile, the subtracter 63 performs the subtraction, $(A=\beta+1)-(B=\beta)$. The result of the subtraction is "2" which is less than the set value "3" in the register 73, the switch 74 is at the position shown in FIG. 6, and the counter 76 is preset with "2". Thus, the counter 76 generates a count-out pulse by counting two of the output pulses, FDP from the monostable multivibrator, and the flip-flop 72 is reset. Therefore, the gate circuit 78 opens its gate while two pulses of FDP are outputted from the monostable multivibrator 56. Consequently, two pulses of the FDP output are outputted as mistracking pulse $P_3$ and $P_4$ through the gate circuit 78, OR gate 79, and the gate circuit 80. Even after the gate circuit 78 closes its gate, the gate circuit 80 still has its gate open, and one pulse of the FRP output shown in FIG. 14(b) is outputted as the mistracking pulse $P_5$. Thus, eventually mistracking pulses $P_3$, $P_4$, and $P_5$ are outputted as shown in FIG. 14(b). Therefore, after playback passes point V for a second time as shown in FIG. 14(a), playback tracks are forcibly shifted two tracks in the forward direction, interposed by the even-number field playback starting point, and caused by the mistracking pulses $P_3$ and $P_4$, and the playback track is forcibly shifted one track in the forward direction by mistracking pulse $P_5$ just prior to the completion of the even-number field playback. After the playback track is shifted by the mistracking pulse $P_5$, the key code signal $\delta$ is read into the memory 58 by the clock pulse $e_\delta$ and stored. In the meantime, the switch 61 has been switched to the position shown in FIG. 6 by the switching signal SW, compared by the comparator 62 as $A=\alpha$ and $B=\delta$. Consequently, the comparator 62 generates no output because $(B=\delta)>(A=\alpha)$, and after the key code signal $\delta$ is read, a forced shifting of the playback tracks does not occur, but normal playback proceeds.

Figure 15A:
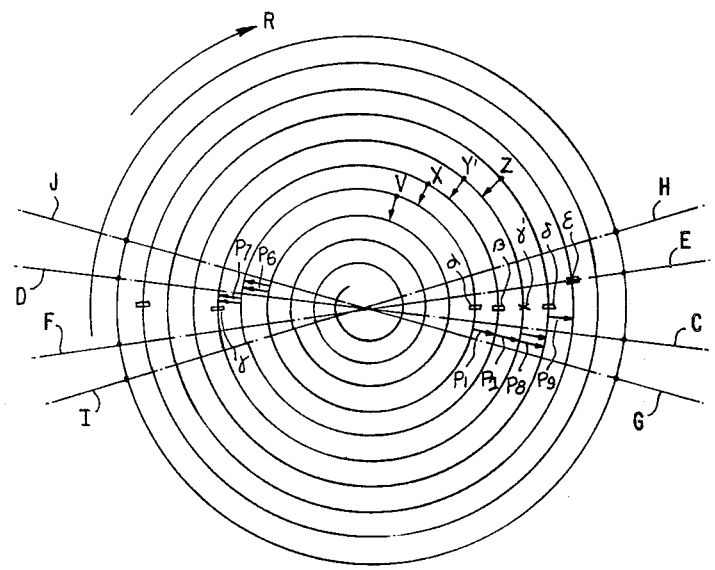
Figure 15B:
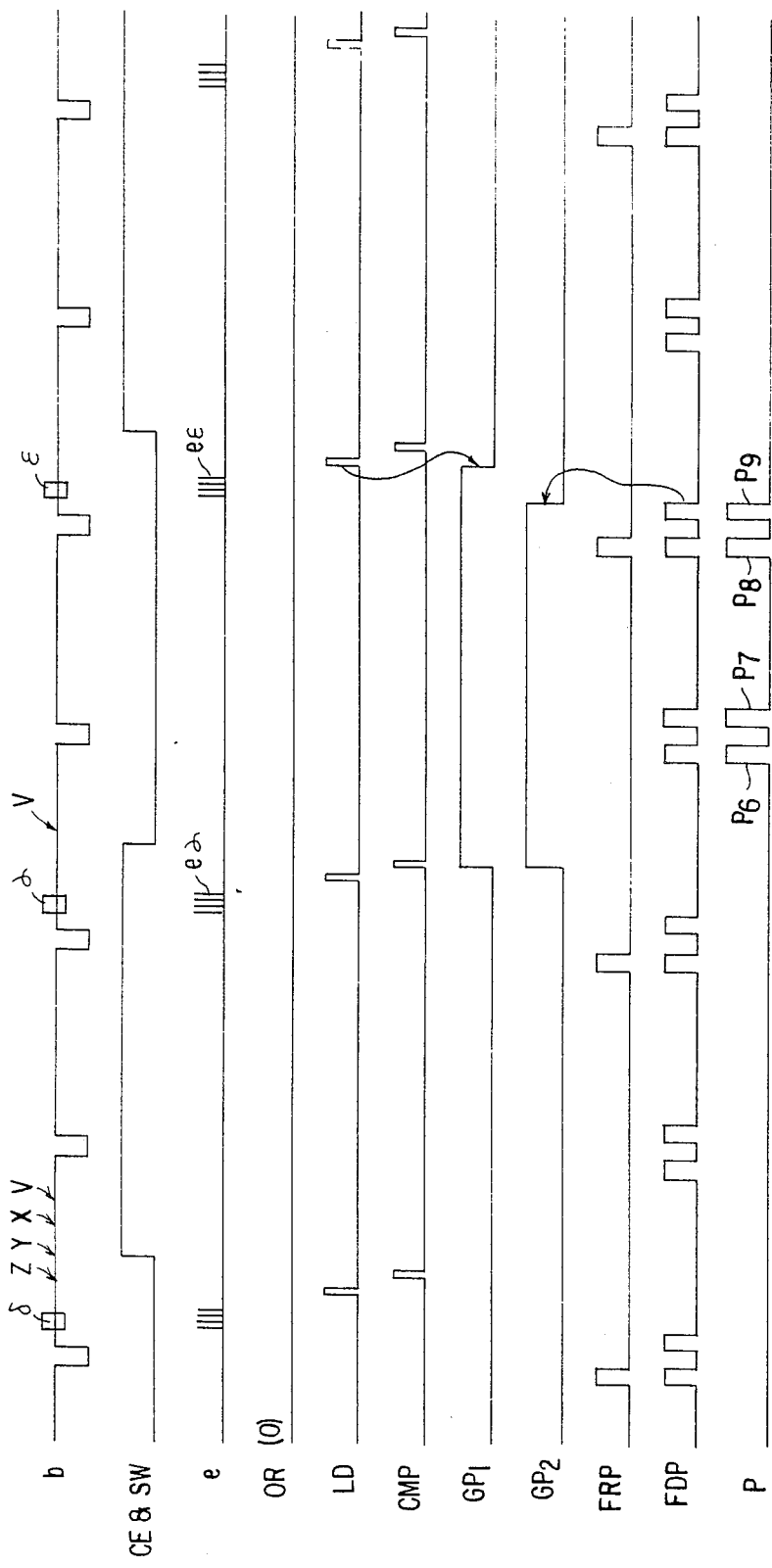

Next, an explanation is made regarding a case in which one more pit omission site Z is added as shown in FIG. 15(a). For the pit omission sites, points V, X, and Y', the actions are the same as explained above with FIGS. 14(a) and (b), and playback proceeds by reading in the key code signal $\delta$ in FIG. 15(a). The waveforms subsequent to this point $\delta$ are shown in FIG. 15(b).

As explained with FIGS. 14(a) and (b), the key code signal $\delta$ is stored in the memory 58. Then, playback proceeds, and the playback track is shifted one track in the reverse direction at point Z, and shifting in the reverse direction continues one track each at points Y', X, and V. Consequently, a key code signal $\alpha$ is read into the memory 59 by the next clock pulse $e_a$ generation and stored. At this time, the switch 61 has been switched to the position in FIG. 6 by the switching signal SW. Thus, $B=\alpha$ and $A=\delta$ will be compared by the comparator 62, the comparator 62 generates an output because $(A=\delta)>(B=\alpha)$, and the flip-flops 71 and 72 are set. On the other hand, the subtracter 63 is performing the $(A=\delta)-(B=\alpha)$ operation, and the result is "3". Since it is the set value "3" or more of the register 73, the switch 74 is switched to the position shown in FIG. 6, and the counter 76 is preset with the value "4" of the register 75. Consequently, the counter 76 counts four of the output pulses, i.e., signal FDP from the monostable multivibrator 56 and generates the count-out output. The flip-flop 72 is reset by this count-out output. Thus, during this time, the flip-flop 72 has a high-level output as shown by waveform $GP_2$ in FIG. 15(b), the gate circuit 78 opens its gate during this time, and only four pulses of signal FDP are passed. These four pulses pass through the gate 80 and are outputted as mistracking pulses $P_6$, $P_7$, $P_8$, and $P_9$. On the other hand, one pulse of the FRP output from the AND gate 81 is passed while the gate circuit 80 has its gate open. This pulse overlaps the above-mentioned mistracking pulse P9, and the mistracking pulses are P6–P9 as shown in FIG. 15(b). The playback tracks are forcibly shifted four tracks in the forward direction as shown in FIG. 15(a) by the mistracking pulses P6–P9. After this shifting is completed, the key code signal ε is read into the memory 58 by the timing pulse $e_ε$ and stored. At this time, the switch 61 has already been switched from the position shown in FIG. 6 by the switching signal SW and compared by the comparator 62 as A=α and B=ε. However, since (A=α)<(B=ε), the comparator 62 generates no output, and subsequently no forced shifting of the playback tracks takes place, but normal playback proceeds.

Figure 16A:
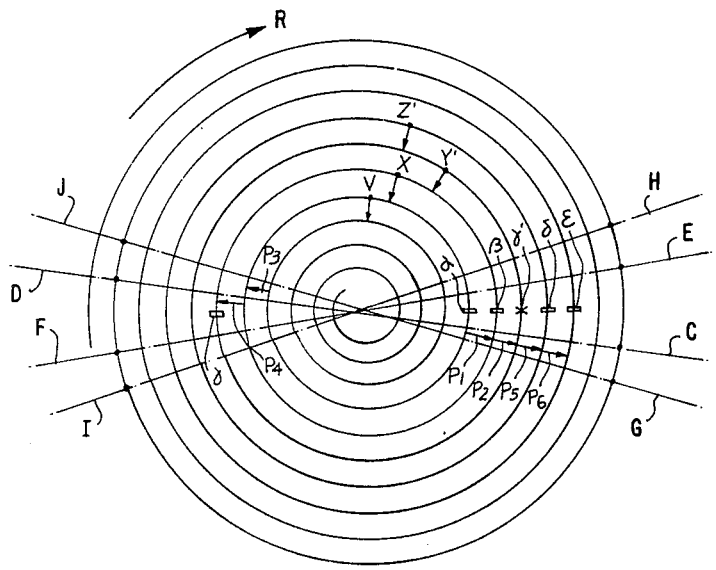

Next, an explanation is made regarding a case when there are four pit omission sites as shown in FIG. 16(a), but the pit omission site, point Z of FIG. 15(a) is now shifted to point Z'. For the pit omission sites, points V, X, and Y', the same actions explained above with FIG. 14(a) and (b) take place, and playback proceeds until the key code signal δ is read. The waveforms from the point of the key code δ reading are shown in FIG. 16(b). As a result of mistracking pulse P5 generation, the tracks are forcibly shifted in the forward direction, and playback continues passing points δ and Z'. At point Z', the playback track is shifted one track in the reverse direction, and returns to the track at which the key code signal δ is recorded. Then, the key code signal δ is read into the memory 59 by the generation of clock pulse $e_δ$ as shown in FIG. 16(b) and stored. Switch 61 has been switched to the position shown in FIG. 6 by the switching signal SW. Or, as explained with FIGS. 14(a) and (b), the key code signal δ has been stored by the previous playback in the memory 58. Therefore, it is compared by the comparator 62 as A=δ and B=δ, comparator 62 generates an output because (A=δ)=(B=δ), and the flip-flop 71 is set. Meanwhile, the output of the subtracter 63 is zero, the counter 76 is not preset, the flip-flop 72 is reset, and the gate circuit 78 has its gate closed. Consequently, one pulse of the FRP output of the AND gate 81 is outputted as a mistracking pulse P6 passing through the OR gate 78 and the gate circuit 80. Therefore, one track is forcibly shifted in the forward direction just before the odd-number field playback. Because of this shifting, the key code signal ε is read into the memory 58 by the next timing pulse $e_ε$ and stored. At this time, the switch 61 has already been switched from the position shown in FIG. 6 by the switching signal SW. And, key code signal δ is being stored at the memory 59. Thus, it is compared by the comparator 62 as B=ε and A=δ, but the comparator 62 generates no output because (B=ε)>(A=δ), and the flip-flops 71 and 72 are not set. Consequently, forced shifting of the playback tracks does not occur hereafter, and after the key code signal ε is read, normal playback is performed.

As explained above, even though a multiple number of pit omission sites are present on consecutive frames during playback, the progression of playback is not interrupted and no still image will result. In the above explanations, the examples cited are cases in which the number of pit omission sites are on the odd-number field side. However, even when they are on the even-number field side or in both odd- and even-number fields, the same actions occur, and playback proceeds without interruption. Also, the explanation was for an example in the case of the playback shifting direction toward the outer edge of the videodisc as the normal playback mode. However, a similar configuration can be used in the case of a playback shifting direction toward the center of the videodisc. In this case, modifications are made such that the comparator 62, for example, generates an output when A≧B.

Furthermore, although the above explanation was for an example of an optical videodisc playback system, the same configuration is applicable even in the cases of a capacitance or mechanical videodisc playback system.

As explained above, when this invention is used, even when an omission in pits on the videodisc occurs, the playback images can be shifted virtually the same as when there is no pit omission, and no still images result.

What is claimed is:

1. A videodisc playback system for playing back a videodisc on which there are recorded on a spiral track, between horizontal synchronizing signals in the vertical retrace time, key code signals corresponding to the field, frame or track numbers, said playback system comprising a playback mode designator (41) to select a playback mode from different playback modes including a normal playback mode, means for rotating said videodisc, reading means for reading video information signals recorded on said spiral track of the rotating videodisc, shifting means for shifting said reading means in a playback shifting direction along a radial of said disc;

tracking means for tracking said spiral track according to the mode selected by said playback mode designator, first and second memories into which consecutively read key code signals are alternately read for temporary storage, shifting pulse generator means for generating at least one shifting pulse where the number of shifting pulses generated (a) corresponds to a number of tracks undesirably travelled by the reading means in the direction opposite to the playback shifting direction and (b) is derived from the difference between the stored key code signals in said first and second memories during a expanded vertical blanking time where said expanded vertical blanking time is a period of time greater than the blanking zone of the standard vertical synchronizing signal of said video information signal; and forced driving means responsive to said shifting pulses for controlling said shifting means to forcibly shift the reading means one track at a time in the playback shifting direction for each shifting pulse to thus position the reading means so as to compensate for its undersirable travel in the direction opposite the playback shifting direction;

whereby image jitter is avoided since the shifting pulses and track correction may occur at anytime during the expanded vertical blanking time.

2. A videodisc playback system for playing back a videodisc on which there are recorded on a spiral track, between horizontal synchronizing signals in the vertical retrace time, key code signals corresponding to the field, frame or track numbers, said playback system comprising:

a playback mode designator (41) to select a playback mode from different playback modes including a normal playback mode, means for rotating said videodisc;

reading means for reading video information signals recorded on said spiral track of the rotating videodisc;

shifting means for shifting said reading means in a playback shifting direction along a radial of said disc;

tracking means for tracking said spiral track according to the mode selected by said playback mode designator;

first and second memories into which consecutively read key code signals are alternately read for temporary storage;

shifting pulse generator means for generating at least one shifting pulse where the number of shifting pulses generated (a) corresponds to a number of tracks undesirably travelled by the reading means in the direction opposite to the playback shifting direction and (b) is derived from the difference between the stored key code signals in said first and second memories during a expanded vertical blanking time where said expanded vertical blanking time is a period of time greater than the blanking zone of the standard vertical synchronizing signal of said video information signal; said shifting pulses generator means including a comparator connected to said first and second memories for detecting said undesirable travel of the reading means in the direction opposite the playback shifting direction by comparing the temporarily stored key code signals that are consecutively read, a subtractor connected to said first and second memories for determining the difference between the consecutively read key codes temporarily stored in said memories, a preset counter (76) preset with the output of said subtractor, said counter counting down in synchronism with the vertical sync pulse read from said videodisc, and gating means enabled by the output of said shifting pulses; and forced driving means responsive to said shifting pulses for controlling said shifting means to forcibly shift the reading means one track at a time in the playback shifting direction for each shifting pulse to thus position the reading means so as to compensate for its undesirable travel in the direction opposite the playback shifting direction;

whereby image jitter is avoided since the shifting pulses and track correction may occur at anytime during the expanded vertical blanking time.

3. A videodisc playback system according to claim 2 wherein said gating means comprises:

first and second pulse generators, said first pulse generator producing a first pulse and a delayed pulse each time said vertical sync pulse is read from said videodisc and said second pulse generator producing only a delayed pulse every other time said vertical sync pulse is read, first and second flip-flops (72, 71) set by the output of said comparator, said second flip-flop being reset in synchronism with the loading of said first and second memories, and a first gate circuit (78) enabled by said first flip-flop, said first gate circuit when enabled passing the output of said first pulse generator, a second gate circuit (79) passing the output of said first gate circuit or said second pulse generator, and a third gate circuit (80) enabled by said second flip-flop and said playback mode designator when normal playback mode is selected, said third gate circuit when enabled passing the output of said second gate circuit as said shifting pulse.

4. The improvement in a videodisc playback system as recited in claims 1, 2 or 3 further comprising:

first and second NOR gates connected respectively to the outputs of said first and second memories for detecting a key code of all "0" bits, and first and second incrementing means connected respectively between the output of said first memory and the input of said second memory and between the output of said second memory and the input of said first memory, the contents of said first memory being incremented by one and read into said second memory when said second NOR gate detects a key code of all "0" bits in said second memory, and the contents of said second memory being incremented by one and read into said first memory when said first NOR gate detects a key code of all "0" bits in said first memory.

* * * * *